(12) United States Patent
Yamamoto

(10) Patent No.: US 8,996,056 B2
(45) Date of Patent: Mar. 31, 2015

(54) WIRELESS COMMUNICATION APPARATUS AND WIRELESS COMMUNICATION

(75) Inventor: Takeshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 13/822,969

(22) PCT Filed: Aug. 8, 2011

(86) PCT No.: PCT/JP2011/068042
§ 371 (c)(1),
(2), (4) Date: Mar. 13, 2013

(87) PCT Pub. No.: WO2012/043064
PCT Pub. Date: Apr. 5, 2012

(65) Prior Publication Data
US 2013/0172040 A1    Jul. 4, 2013

(30) Foreign Application Priority Data

Sep. 30, 2010   (JP) .................................. 2010-221180

(51) Int. Cl.
| | |
|---|---|
| *H04B 7/00* | (2006.01) |
| *H04W 52/38* | (2009.01) |
| *H04W 16/08* | (2009.01) |
| *H04W 28/02* | (2009.01) |
| *H04W 52/34* | (2009.01) |

(52) U.S. Cl.
CPC .............. *H04W 52/38* (2013.01); *H04W 16/08* (2013.01); *H04W 28/0221* (2013.01); *H04W 52/343* (2013.01); *H04W 28/02* (2013.01); *Y02B 60/50* (2013.01)
USPC ............... 455/522; 455/69; 455/70; 370/310; 370/311; 370/312; 370/315; 370/318; 709/227; 709/228; 709/229

(58) Field of Classification Search
USPC ...................... 455/522, 69–70; 370/310–320; 709/227–229
See application file for complete search history.

(56) References Cited

U.S. PATENT DOCUMENTS

| | | | |
|---|---|---|---|
| 8,452,317 B2 * | 5/2013 | Li et al. ........................ | 455/522 |
| 8,495,232 B2 * | 7/2013 | Wu et al. ...................... | 709/230 |
| 2010/0022190 A1 * | 1/2010 | Laroia et al. ............... | 455/67.11 |

FOREIGN PATENT DOCUMENTS

| | | |
|---|---|---|
| JP | 200625028 A | 1/2006 |
| JP | 2007212303 A | 8/2007 |

(Continued)

OTHER PUBLICATIONS

The international search report for PCT/JP2011/068042 mailed on Nov. 11, 2011.

*Primary Examiner* — Fayyaz Alam
(74) *Attorney, Agent, or Firm* — Sughrue Mion, PLLC

(57) ABSTRACT

Each of a plurality of wireless communication apparatuses determines a factor that indicates wireless communication congestion and compares the factor that indicates wireless communication congestion with a predetermined first threshold value. Each wireless communication apparatus then judges, by means of transmission power set values that are received from other wireless communication apparatuses, whether the transmission power of the wireless communication apparatuses is at the same level as or at a lower level than that of its own wireless communication apparatus. The wireless communication apparatus lowers the transmission power set value by one level when the transmission power of other wireless communication apparatuses is at the same level as or at a lower level than that of its own wireless communication apparatus and when the factor that indicates wireless communication congestion exceeds a first threshold value.

7 Claims, 3 Drawing Sheets

(56) References Cited

FOREIGN PATENT DOCUMENTS

| | | | |
|---|---|---|---|
| JP | 2008507883 A | 3/2008 |
| JP | 2008244960 A | 10/2008 |
| JP | 2010130222 A | 6/2010 |
| WO | 2008099716 A1 | 8/2008 |
| WO | 2009107297 A1 | 9/2009 |

* cited by examiner

WIRELESS COMMUNICATION APPARATUS AND WIRELESS COMMUNICATION

This application is a National Stage Entry of PCT/JP2011/068042 filed Aug. 8, 2011, which claims priority from Japanese Patent Application 2010-221180 filed Sep. 30, 2010, the contents of all of which are incorporated herein by reference, in their entirety.

TECHNICAL FIELD

The present invention relates to a wireless communication apparatus and a wireless communication system for carrying out direct communication with other wireless communication apparatuses that are communication partners.

BACKGROUND ART

In a wireless communication system such as an intervehicle communication system that carries out direct communication among wireless communication apparatuses without communicating by way of a wireless base station, communication conditions are assumed to change minute to minute with the movement of wireless communication apparatuses, with communication partners within the range in which communication is possible (communication range) being absent or few in number, or partners that can communicate becoming extremely numerous due to the dense concentration of communication apparatuses within a predetermined area.

Of these conditions, a condition in which wireless communication apparatuses are crowded together raises the problem that communication between wireless communication apparatuses increases, leading to congestion and a decrease in throughput. To deal with this type of problem, a method is proposed in Patent Document 1 in which congestion and the reduction of throughput is mitigated while ensuring wireless links with relatively close wireless communication apparatuses by controlling the transmission power to adjust the size of the communication range and thus limit the number of wireless communication apparatuses that are communication partners.

In the method disclosed in the above-described Patent Document 1, when a particular wireless communication apparatus decreases transmission power to decrease the communication range, the congestion of wireless communication is mitigated for other wireless communication apparatuses that are present outside the communication range because they become unable to detect wireless signals transmitted from the wireless communication apparatus that has decreased transmission power.

Nevertheless, in a wireless communication apparatus that has decreased transmission power, wireless signals that are transmitted from wireless communication apparatuses that are outside the communication range and that have not decreased transmission power are still detected as before, and the advantage derived from easing the congestion of wireless communication (enabling a mitigation of congestion and decrease of throughput) therefore cannot be obtained in the wireless communication apparatus.

LITERATURE OF THE PRIOR ART

Patent Documents

Patent Document 1: Japanese Patent Laid-Open No. 2008-244960

SUMMARY

The present invention therefore has as an object providing a wireless communication apparatus and wireless communication system in which the congestion of wireless communication is eased to mitigate congestion and the decrease of throughput even for a wireless communication apparatus that has decreased transmission power.

To accomplish the foregoing object, the wireless communication apparatus according to an exemplary aspect of the present invention is a wireless communication apparatus that carries out direct communication with other wireless communication apparatuses that are communication partners and includes:

a control unit that finds the factor that indicates wireless communication congestion that is an index indicating the amount of communication due to the other wireless communication apparatuses on wireless channels that carry out communication;

a congestion control unit that determines a transmission power set value that is the value of transmission power of its own wireless communication apparatus based on the factor that indicates wireless communication congestion and the values of transmission power for each of the other wireless communication apparatuses; and a wireless unit that transmits to the other wireless communication apparatuses wireless signals that contain as information the transmission power set value at transmission power that accords with the transmission power set value that was determined in the congestion control unit; wherein the congestion control unit:

is capable of setting the transmission power set value at a plurality of levels that are set in advance;

judges whether the transmission power of the wireless communication apparatuses is at the same level as or at a lower level than that of its own wireless communication apparatus based on the transmission power set values that are received from the other wireless communication apparatuses;

compares the factor that indicates wireless communication congestion with a first threshold value that is set in advance; and lowers by one level the transmission power set value when the transmission power of the wireless communication apparatuses is at the same level as or at a lower level than that of its own wireless communication apparatus and when the factor that indicates wireless communication congestion exceeds the first threshold value.

The wireless communication system of the present invention is of a configuration equipped with a plurality of the above-described wireless communication apparatuses and carries out direct communication among the wireless communication apparatuses.

EXEMPLARY EMBODIMENT

Figure 1:
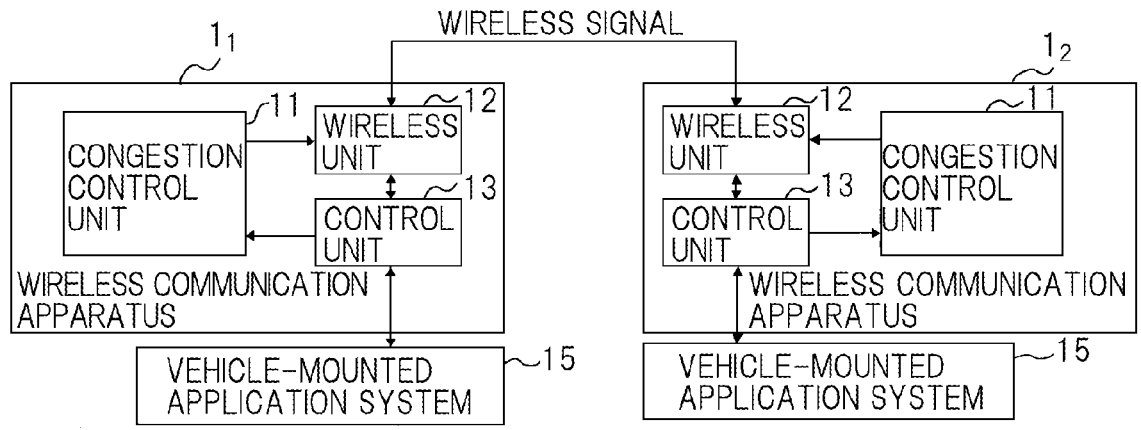
FIG. 1 is a block diagram showing an example of the configuration of a wireless communication system.

The present invention is next described using the accompanying drawings.

In an intervehicle communication system that is an example of an object to which the present invention is applied, each wireless communication apparatus that is installed in vehicles transmits at each of predetermined periods to wireless communication apparatuses that are installed in neighboring vehicles positional information of its own vehicle and set values of transmission power (hereinbelow referred to as "transmission power set values"). In addition, each wireless communication apparatus saves the positional information and transmission power set value that are received from each neighboring vehicle and information such as the reception power and reception time for each neighboring vehicle as neighboring vehicle information and updates each item of neighboring vehicle information that corresponds to each item of positional information that is received and to each transmission power set value received from each neighboring vehicle.

In the wireless communication system of the present exemplary embodiment, the factor that indicates wireless communication congestion, and which is an index indicating the amount of communication due to other wireless communication apparatuses on wireless channels in which communication is carried out, is found in each wireless communication apparatus. The factor that indicates wireless communication congestion may use a "wireless channel congestion factor" that is detected by using, for example, a known carrier sensing function and that indicates the state of use of a plurality of wireless channels that can be used in the wireless communication system or a "wireless communication apparatus congestion factor" that indicates the number or concentration of wireless communication apparatuses that can communicate and that is found by using the neighboring vehicle information for each neighboring vehicle.

In the wireless communication system of the present exemplary embodiment, when the factor that indicates wireless communication congestion and that is detected in wireless communication apparatuses exceeds a threshold value (first threshold value) that has been set in advance, a level of the transmission power of the wireless communication apparatus is decreased. If the transmission power is decreased one level at this time, it is then judged whether or not the wireless communication apparatuses of neighboring vehicles have similarly decreased transmission power by one level, i.e., whether the transmission power of wireless communication apparatuses of neighboring vehicles is at the same level as or at a lower level than the transmission power of its own wireless communication apparatus. The transmission power from each neighboring vehicle can be checked at the transmission power set value for each neighboring vehicle that is saved as the above-described neighboring vehicle information. If the wireless communication apparatuses of neighboring vehicles have lower transmission power similar to its own wireless communication apparatus, and moreover, if wireless communication is still congested as before (if the factor that indicates wireless communication congestion exceeds the above-described first threshold value), the wireless communication apparatus further lowers the transmission power by one level.

If this type of process is executed by each wireless communication apparatus, each wireless communication apparatus within a range that allows mutual communication equally decreases the transmission power, whereby wireless signals transmitted from wireless communication apparatuses that are relatively distant eventually become undetectable. As a result, the factor that indicates wireless communication congestion decreases, and congestion and reduction of throughput is mitigated.

Figure 2:
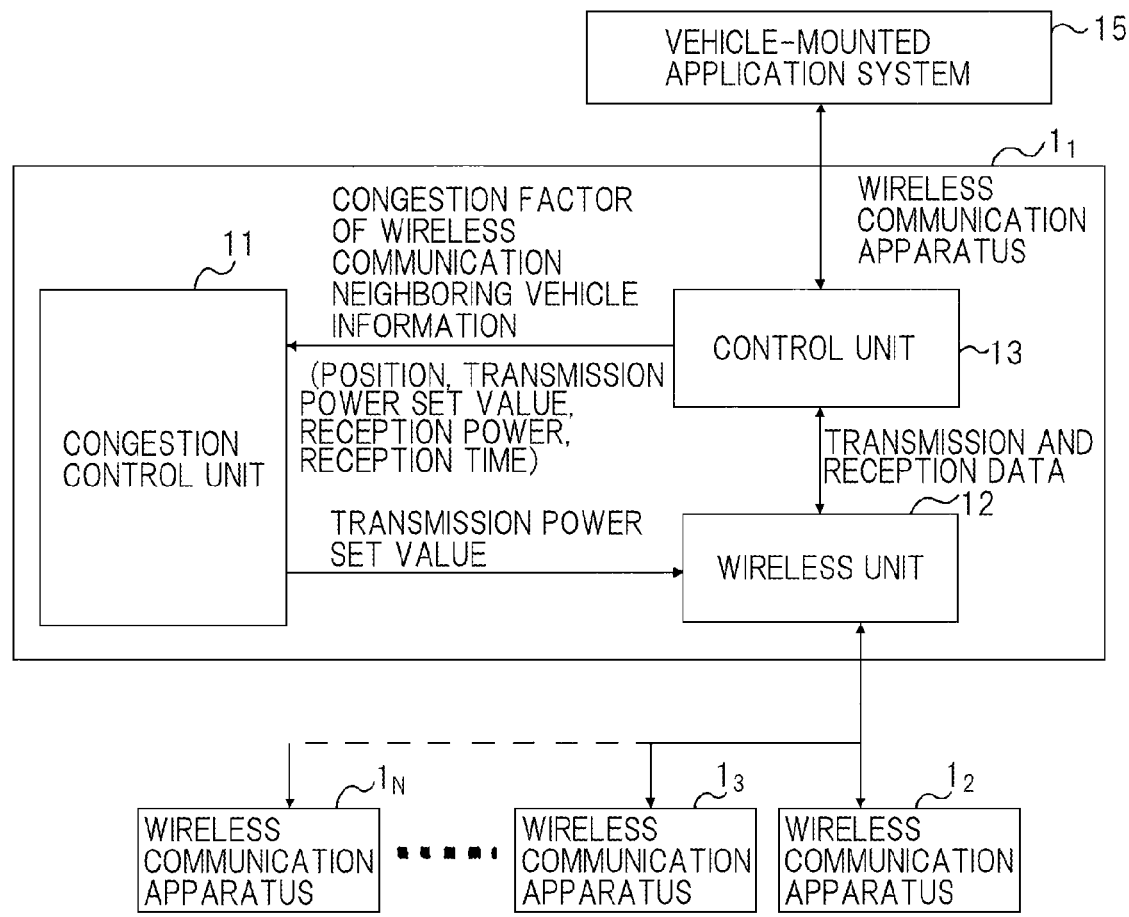
FIG. 2 is a block diagram showing an example of the configuration of a wireless communication apparatus shown in FIG. 1.

FIG. 1 is a block diagram showing an example of the configuration of a wireless communication system. FIG. 2 is a block diagram showing an example of the configuration of a wireless communication apparatus shown in FIG. 1. In addition, FIG. 1 shows an example of the configuration when the wireless communication system of the present invention is applied to an intervehicle communication system.

As shown in FIG. 1, the wireless communication system of the present invention is a construction that carries out direct communication among wireless communication apparatuses 1 (wireless communication apparatuses $1_1$ and $1_2$ in FIG. 1) that are equipped in, for example, vehicles. In wireless communication apparatuses $1_1$ and $1_2$, known vehicle-mounted application systems 15 such as a GPS system, car navigation systems that are equipped with various types of vehicle-mounted sensors, and safe driving support systems are connected, and wireless communication apparatuses $1_1$ and $1_2$ transmit and receive necessary information with vehicle-mounted application systems 15.

As shown in FIG. 2, a wireless communication apparatus of the present exemplary embodiment is equipped with congestion control unit 11, wireless unit 12, and control unit 13.

Control unit 13 both transmits various types of information to and receives various types of information from vehicle-mounted application system 15 and supplies congestion control unit 11 with the above-described the factor that indicates wireless communication congestion found by using neighboring vehicle information and a carrier sensing capability. Control unit 13 is further equipped with a storage device for saving neighboring vehicle information for all wireless communication apparatuses 1.

Based on the factor that indicates wireless communication congestion and that is supplied from control unit 13 and the transmission power set values for each neighboring vehicle that is contained in the neighboring vehicle information, congestion control unit 11 determines the transmission power set value of its own wireless communication apparatus (wireless communication apparatus $1_1$ in FIG. 2) and supplies the transmission power set value that was determined to wireless unit 12.

Wireless unit 12 is a transceiver device that transmits wireless signals to and receives wireless signals from other wireless communication apparatuses 1 (in FIG. 2, wireless communication apparatuses $1_2$-$1_N$ (where N is a positive integer)) that are installed in neighboring vehicles. Wireless unit 12 transmits wireless signals in accordance with the transmission power set value that was determined in congestion control unit 11.

Congestion control unit 11 and control unit 13 shown in FIG. 2 may be realized by, for example, LSI that includes D/A converters, A/D converters, and various logic circuits, and can be realized by an information processing device (computer) that is equipped with a CPU that executes processing in accordance with a program. Wireless unit 12 shown in FIG. 2 may use a transmission device and reception device in which is applied, for example, an intervehicle communication system in which the wireless communication system of the present invention is applied.

The operations of the wireless communication system of the present exemplary embodiment are next described using the accompanying drawings.

As shown in FIGS. 1 and 2, wireless communication apparatuses 1 transmit to and receive from vehicle-mounted application system 15 various types of information that correspond to vehicle-mounted application system 15 such as positional information, reception power, and reception time for its own vehicle and neighboring vehicles.

Upon receiving a wireless signal from a neighboring vehicle, wireless unit 12 demodulates and decodes the wireless signal to reproduce the information (data) that was received and supplies the received data to control unit 13.

In addition to supplying the received data to vehicle-mounted application system 15, control unit 13 uses a known carrier-sensing capability to distinguish the state of use of each wireless channel based on the received data and finds the factor that indicates congestion of the wireless channels. Alternatively, control unit 13 finds the number or concentration of wireless communication apparatuses that can communicate based on neighboring vehicle information and thus detects the factor that indicates congestion of the wireless communication apparatuses. Control unit 13 supplies the factor that indicates wireless communication congestion that was found (the factor that indicates congestion of the wireless channels or the factor that indicates congestion of the wireless communication apparatuses) to congestion control unit 11. In addition, control unit 13 supplies transmission data such as positional information that was supplied from vehicle-mounted application system 15 to wireless unit 12.

Congestion control unit 11 determines the transmission power set value of its own wireless communication apparatus (wireless communication apparatus $1_1$ in FIG. 2) based on the factor that indicates wireless communication congestion and that was supplied from control unit 13 and the transmission power set value for each neighboring vehicle that is contained in neighboring vehicle information and supplies the transmission power set value that was determined to wireless unit 12.

Wireless unit 12 adds the transmission power set value that was determined at congestion control unit 11 to the transmission data that was received from control unit 13, encodes and modulates the transmission data that include the transmission power set value to convert to a wireless signal, and transmits data at the transmission power having the transmission power set value that was determined by congestion control unit 11.

Figure 3:
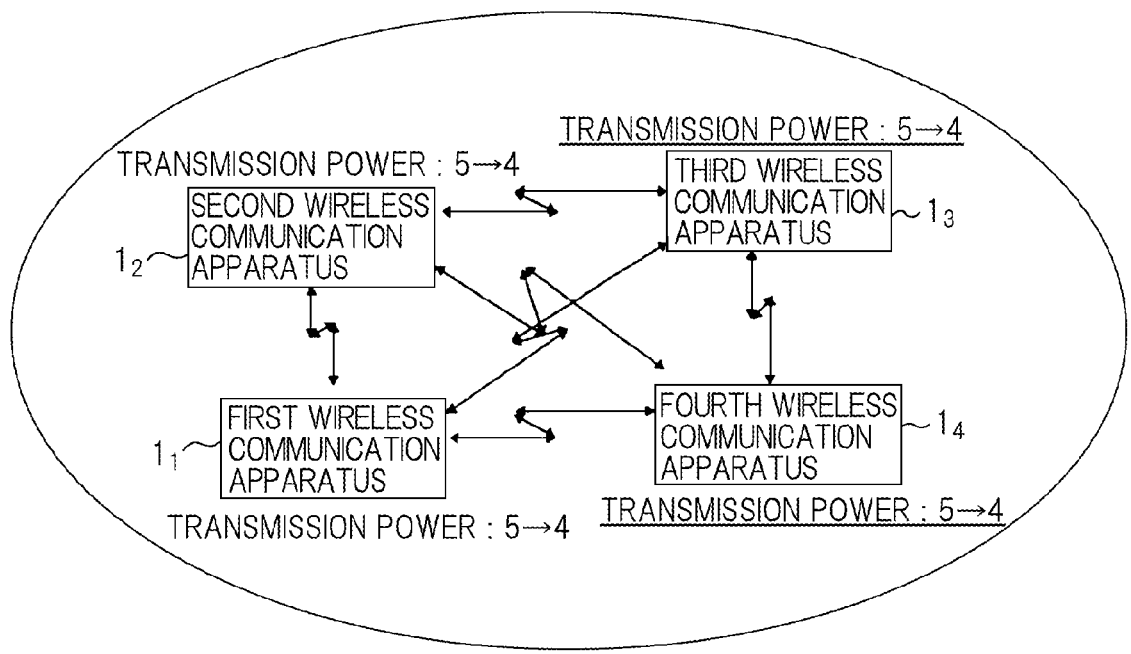
FIG. 3 is a schematic view showing an example of the operations of the wireless communication system shown in FIG. 1.
Figure 4:
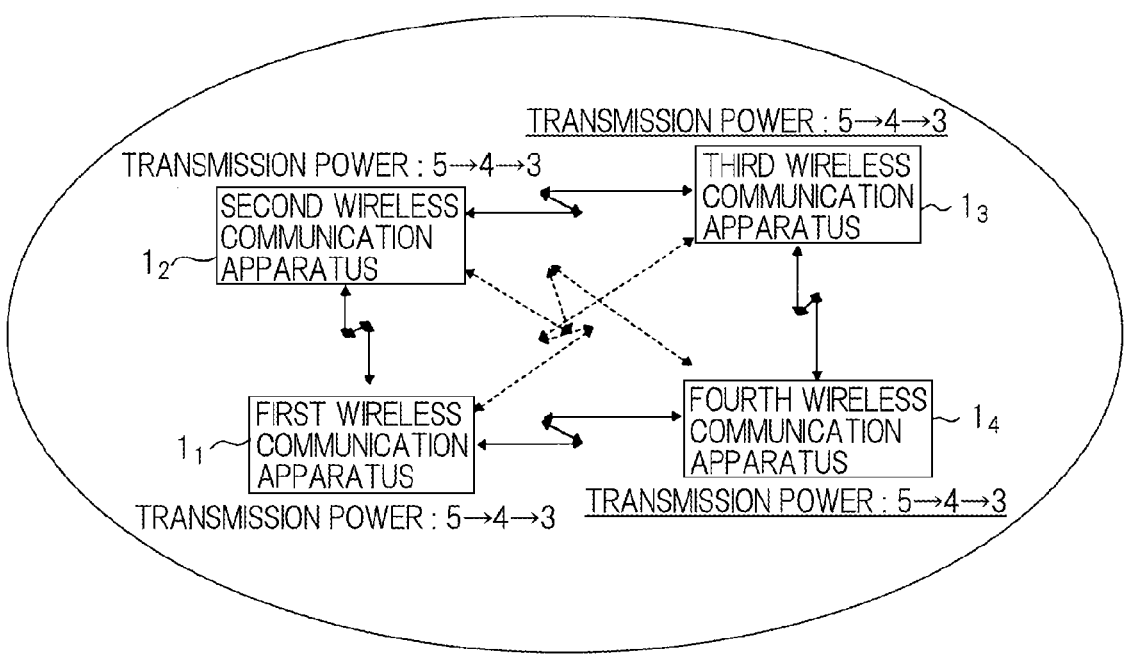
FIG. 4 is a schematic view showing an example of the operations of the wireless communication system shown in FIG. 1.

The operations of the wireless communication system of the present invention are next described taking as an example a case in which wireless communication apparatuses 1 that are installed in four vehicles as shown in FIGS. 3 and 4 (in FIGS. 3 and 4, first wireless communication apparatus $1_1$, second wireless communication apparatus $1_2$, third wireless communication apparatus $1_3$, and fourth wireless communication apparatus $1_4$) are within a range that allows mutual communication. The number of wireless communication apparatuses 1 that perform communication is not limited to four, and any number that is two or more is possible. In each of wireless communication apparatuses 1, the transmission power is assumed to be set at one of five levels from "1" to "5," the transmission power increasing in the order of levels "1," "2," "3," "4," and "5." The actual numerical value (or range) of transmission power that corresponds to each level may be set as appropriate according to the system in which the present invention is applied. In addition, the number of levels of transmission power is not limited to five levels and may be any number of levels as long as there are at least two levels. The processes shown hereinbelow are assumed to be executed by congestion control unit 11 that is provided in first wireless communication apparatus $1_1$-fourth wireless communication apparatus $1_4$ unless the apparatus that will perform a processing operation is specified.

First wireless communication apparatus $1_1$-fourth wireless communication apparatus $1_4$ find the factor that indicates wireless communication congestion with each update of neighboring vehicle information by control unit 13. Regarding the factor that indicates wireless communication congestion, the factor that indicates congestion of the wireless channels may be found by using a known carrier sensing capability as described above or the factor that indicates congestion of wireless communication apparatuses may be found from the number or concentration of wireless communication apparatuses that are installed in neighboring vehicles based on neighboring vehicle information.

In this case, when first wireless communication apparatus $1_1$ detects a factor that indicates wireless communication congestion that exceeds a first threshold value that was set in advance, first wireless communication apparatus $1_1$ decreases the transmission power by one level from the normal transmission power value, for example, from "5" to "4." Similarly, upon detecting a factor that indicates wireless communication congestion that exceeds the first threshold value that was set in advance, second wireless communication apparatus $1_2$ to fourth wireless communication apparatus $1_4$ decrease the normal transmission power value of the transmission power by one level from "5" to "4."

First wireless communication apparatus $1_1$ next determines based on the transmission power set values that are contained in neighboring vehicle information that corresponds to second wireless communication apparatus $1_2$ to fourth wireless communication apparatus $1_4$ whether or not second wireless communication apparatus $1_2$ to fourth wireless communication apparatus $1_4$ have decreased the transmission power to "4", i.e., whether or not the transmission power of second wireless communication apparatus $1_2$ to fourth wireless communication apparatus $1_4$ is at the same level as or a lower level than that of its own wireless communication apparatus. If second wireless communication apparatus $1_2$ to fourth wireless communication apparatus $1_4$ have decreased transmission power to "4," and moreover, if the factor that indicates wireless communication congestion still exceeds the first threshold value that was set in advance, first wireless communication apparatus $1_1$ lowers the transmission power value by yet another level to "3." Similarly, upon detecting that the factor that indicates wireless communication congestion exceeds the first threshold value that was set in advance, second wireless communication apparatus $1_2$ to fourth wireless communication apparatus $1_4$ further decrease the transmission power value by one level to "3."

When first wireless communication apparatus $1_1$ to fourth wireless communication apparatus $1_4$ each successively decrease transmission power by levels in this way, radio waves eventually fail to reach wireless communication apparatuses that are relatively remote from each other as, for example, first wireless communication apparatus $1_1$ and third wireless communication apparatus $1_3$ or second wireless communication apparatus $1_2$ and fourth wireless communication apparatus $1_4$ shown in FIG. 4 (communication paths being indicated by broken lines). As a result, communication partners for first wireless communication apparatus $1_1$ are reduced to second wireless communication apparatus $1_2$ and fourth wireless communication apparatus $1_4$, and the communication partners for second wireless communication apparatus $1_1$ are reduced to first wireless communication apparatus $1_1$ and third wireless communication apparatus $1_3$. Similarly, the communication partners for third wireless communication apparatus $1_3$ are reduced to second wireless communication apparatus $1_2$ and fourth wireless communication apparatus $1_4$, and the communication partners for fourth wireless communication apparatus $1_4$ are reduced to first wireless communication apparatus $1_1$ and third wireless communication apparatus $1_3$, and the factor that indicates wireless communication congestion is therefore mitigated.

On the other hand, when the factor that indicates wireless communication congestion changes due to movement of each vehicle in a state in which first wireless communication apparatus $1_1$ to fourth wireless communication apparatus $1_4$ each set the transmission power value to "3" and the factor that indicates congestion at first wireless communication apparatus $1_1$ falls below a second threshold value that is set in advance, first wireless communication apparatus $1_1$ raises the transmission power value to "4." Similarly, when the factor that indicates wireless communication congestion falls below the second threshold value that has been set in advance, second wireless communication apparatus $1_2$ to fourth wireless communication apparatus $1_4$ raise the transmission power value by one level to "4."

First wireless communication apparatus $1_1$ further determines, based on the transmission power set values that are contained in neighboring vehicle information that corresponds to second wireless communication apparatus $1_2$ to fourth wireless communication apparatus $1_4$, whether or not second wireless communication apparatus $1_2$ to fourth wireless communication apparatus $1_4$ have raised the transmission power values to "4", i.e., whether the transmission power of second wireless communication apparatus $1_2$ to fourth wireless communication apparatus $1_4$ is at the same level as or a lower level than that of its own wireless communication apparatus. When second wireless communication apparatus $1_2$ to fourth wireless communication apparatus $1_4$ have raised the transmission power value to "4," and moreover, when the factor that indicates wireless communication congestion is still lower than the second threshold value that was set in advance, first wireless communication apparatus $1_1$ further raises the transmission power value by one level to "5" and thus returns the transmission power value to the normal transmission power value. Similarly, when the factor that indicates wireless communication congestion is lower than the second threshold value that was set in advance, second wireless communication apparatus $1_2$ to fourth wireless communication apparatus $1_4$ further raise the transmission power value by one level to "5" and thus return the transmission power value to the normal transmission power value.

When each wireless communication apparatus thus lowers the transmission power by one level at a time in accordance with the factor that indicates wireless communication congestion while verifying whether the transmission power of neighboring wireless communication apparatuses that can communicate is at the same level as or a lower level than that of its own apparatus, each of wireless communication apparatuses 1 that are at a comparatively close distance equally lowers the transmission power. As a result, even each of the wireless communication apparatuses that have lowered transmission power can obtain the advantages realized by the mitigation of congestion, and congestion and decrease of throughput can thus be eased.

Figure 5:
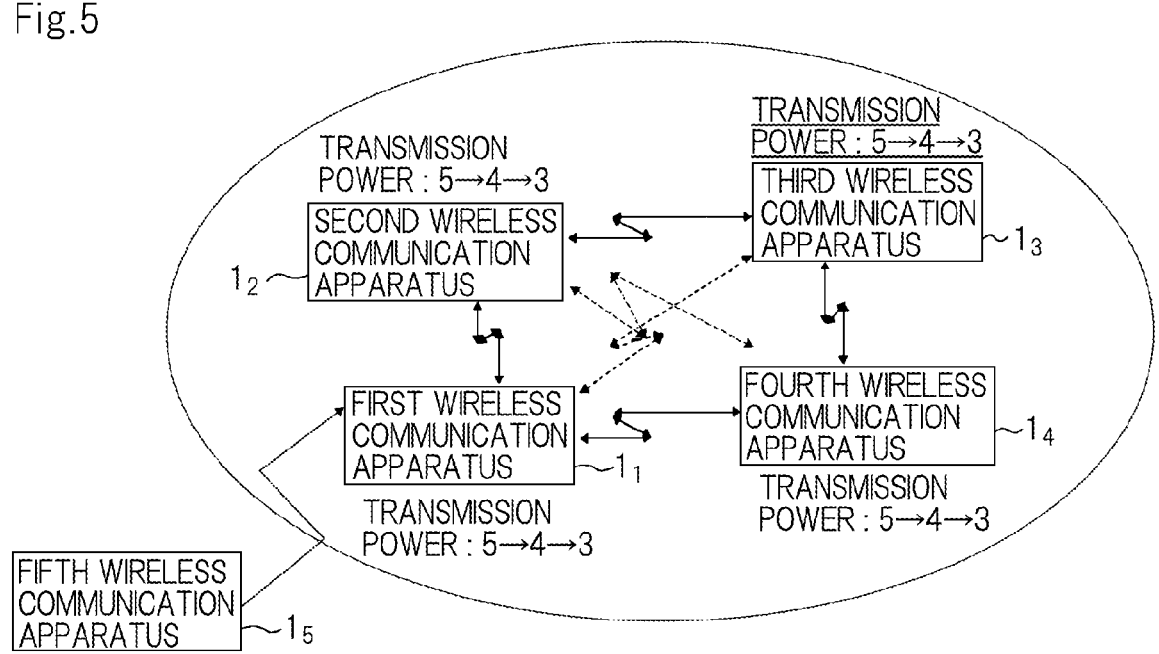
FIG. 5 is a schematic view showing another example of the operations of the wireless communication system shown in FIG. 1.

As shown in FIG. 5, a case can be considered in which fifth wireless communication apparatus $1_5$, which is at a position that is comparatively remote from second wireless communication apparatus $1_2$ to fourth wireless communication apparatus $1_4$ but comparatively close to first wireless communication apparatus $1_1$ as shown in, for example, FIG. 3 or FIG. 4, maintains transmission power at "5" even if first wireless communication apparatus $1_1$ lowers the transmission power value from "5" to "4" because the factor that indicates wireless communication congestion does not exceed the first threshold value. In this case, fifth wireless communication apparatus $1_5$ does not lower the transmission power, whereby the possibility arises that the effect realized by first wireless communication apparatus $1_1$ to fourth wireless communication apparatus $1_4$ of equally lowering transmission power as described above is not obtained if first wireless communication apparatus $1_1$ does not perform the process of further lowering the transmission power.

In order to deal with this case, when a preset proportion of wireless communication apparatuses among wireless communication apparatuses that can communicate lower the transmission power, i.e., when the transmission power of a proportion that has been set in advance of other wireless communication apparatuses is at the same level as or at a lower level than that of its own wireless communication apparatus and when the factor that indicates wireless communication congestion exceeds the first threshold value, each of wireless communication apparatuses 1 should further lower the transmission power.

In the foregoing description, an example was described in which transmission power is controlled in congestion control unit 11 to mitigate congestion of wireless communication, but instead of controlling the transmission power, congestion of wireless communication may also be eased by widening the transmission period or transmission spacing or may be eased by raising the transfer rate to shorten the transmission time of one transmission. The transfer rate may be raised by, for example, converting the modulation method that is used to a multivalued modulation method that is capable of loading more information.

In the foregoing description, an example was described in which the wireless communication system of the present invention is applied in an intervehicle communication system, but if a portion of the wireless communication apparatuses for mounting in vehicles are replaced with wireless communication apparatuses that are installed at road sides, the wireless communication system of the present invention can also be applied to a road-vehicle communication system in which information is transmitted and received between wireless communication apparatuses for mounting in vehicles and wireless communication apparatuses for roadside use.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application is based upon and claims the benefit of priority from Japanese patent application No. 2010-221180, filed on Sep. 30, 2010, the disclosure of which is incorporated herein in its entirety by reference.

What is claimed is:

1. A wireless communication apparatus that carries out direct communication with other wireless communication apparatuses that are communication partners, comprising:
a control unit that finds the factor that indicates wireless communication congestion that is an index indicating the amount of communication due to said other wireless communication apparatuses on wireless channels that carry out communication;

a congestion control unit that determines a transmission power set value that is the value of transmission power of its own wireless communication apparatus based on said factor that indicates wireless communication congestion and the values of transmission power for each of said other wireless communication apparatuses; and a wireless unit that transmits to said other wireless communication apparatuses wireless signals that contain as information the transmission power set value at a transmission power that accords with said transmission power set value that was determined in said congestion control unit;

wherein said congestion control unit:

is capable of setting said transmission power set value to a plurality of levels that are set in advance;

judges whether the transmission power of the wireless communication apparatuses is at the same level as or at a lower level than that of its own wireless communication apparatus based on said transmission power set values that are received from said other wireless communication apparatuses;

compares said factor that indicates wireless communication congestion with a first threshold value that is set in advance; and lowers by one level said transmission power set value when the transmission power of the wireless communication apparatuses is at the same level as or at a lower level than that of its own wireless communication apparatus and when said factor that indicates wireless communication congestion exceeds said first threshold value.

2. The wireless communication apparatus as set forth in claim 1, wherein said congestion control unit lowers said transmission power set value by one level when, from among a plurality of said other wireless communication apparatuses, the transmission power of a proportion that has been set in advance of other wireless communication apparatuses is at the same level as or at a lower level than that of its own wireless communication apparatus and when said factor that indicates wireless communication congestion exceeds said first threshold value.

3. The wireless communication apparatus as set forth in claim 1, wherein said congestion control unit compares said factor that indicates wireless communication congestion with a second threshold value that has been set in advance, and raises said transmission power set value by one level when said factor that indicates wireless communication congestion is lower than said second threshold value.

4. The wireless communication apparatus as set forth in claim 1, wherein said factor that indicates wireless communication congestion uses a factor that indicates congestion of wireless channels that indicates the state of use of a plurality of wireless channels or a factor that indicates congestion of wireless communication apparatuses that indicates the number or concentration of said other wireless communication apparatuses.

5. The wireless communication apparatus as set forth in claim 1, wherein said congestion control unit:

is capable of setting the transmission period or transfer rate to a plurality of levels that are set in advance; and when said factor that indicates wireless communication congestion exceeds said first threshold value, instead of said transmission power, widens said transmission period by one level or raises said transfer rate by one level.

6. The wireless communication apparatus as set forth in claim 1, wherein said other wireless communication apparatuses include a wireless communication apparatus that is installed at a road side.

7. A wireless communication system that is equipped with a plurality of the wireless communication apparatuses as set forth in claim 1 and carries out direct communication among said wireless communication apparatuses.

* * * * *